United States Patent
Mizutani et al.

(10) Patent No.: US 9,273,382 B2
(45) Date of Patent: Mar. 1, 2016

(54) STAINLESS STEEL FOIL AND CATALYST CARRIER FOR EXHAUST GAS PURIFYING DEVICE USING THE FOIL

(75) Inventors: Akito Mizutani, Chiba (JP); Kunio Fukuda, Chiba (JP); Shin Ishikawa, Chiba (JP); Atsutaka Honda, Chiba (JP); Yasuhiro Yamaguchi, Hyogo (JP); Yasushi Kato, Chiba (JP); Hiroki Ota, Chiba (JP); Mitsuyuki Fujisawa, Chiba (JP); Takumi Ujiro, Chiba (JP); Hideaki Yamashita, Chiba (JP)

(73) Assignee: JFE Steel Corporation (JP)

( * ) Notice: Subject to any disclaimer, the term of this patent is extended or adjusted under 35 U.S.C. 154(b) by 474 days.

(21) Appl. No.: 13/637,409

(22) PCT Filed: Mar. 18, 2011

(86) PCT No.: PCT/JP2011/057489
§ 371 (c)(1),
(2), (4) Date: Dec. 5, 2012

(87) PCT Pub. No.: WO2011/122503
PCT Pub. Date: Oct. 6, 2011

(65) Prior Publication Data
US 2013/0196172 A1    Aug. 1, 2013

(30) Foreign Application Priority Data
Mar. 30, 2010 (JP) .................... 2010-076605

(51) Int. Cl.
*C22C 38/50* (2006.01)
*C22C 38/44* (2006.01)
(Continued)

(52) U.S. Cl.
CPC .............. *C22C 38/12* (2013.01); *B23K 1/0014* (2013.01); *B23K 11/0093* (2013.01); *B23K 20/023* (2013.01); *C21D 6/002* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01);
(Continued)

(58) Field of Classification Search
None
See application file for complete search history.

(56) References Cited

U.S. PATENT DOCUMENTS

| | | | |
|---|---|---|---|
| 4,331,631 A | | 5/1982 | Chapman et al. |
| 5,228,932 A | * | 7/1993 | Shimizu et al. ............... 148/603 |

(Continued)

FOREIGN PATENT DOCUMENTS

| | | |
|---|---|---|
| JP | 56-096726 A | 8/1981 |
| JP | 5-277380 A | 10/1993 |

(Continued)

OTHER PUBLICATIONS

Machine-English translation of Japanese Patent No. 06-212363, Kono Masaaki et al., Aug. 2, 1994.*

(Continued)

*Primary Examiner* — Deborah Yee
(74) *Attorney, Agent, or Firm* — DLA Piper LLP (US)

(57) ABSTRACT

A stainless steel foil contains, in percent by mass, 0.05% or less of C, 2.0% or less of Si, 1.0% or less of Mn, 0.003% or less of S, 0.05% or less of P, 25.0% to 35.0% of Cr, 0.05% to 0.30% of Ni, 3.0% to 10.0% of Al, 0.10% or less of N, 0.02% or less of Ti, 0.02% or less of Nb, 0.02% or less of Ta, 0.005% to 0.20% of Zr, 0.02% or less of Ce, 0.03% to 0.20% of REM excluding Ce, 0.5% to 6.0% in total of at least one of Mo and W, and the balance being Fe and incidental impurities.

16 Claims, 3 Drawing Sheets

(51) Int. Cl.
- C22C 38/06 (2006.01)
- C22C 38/12 (2006.01)
- B23K 1/00 (2006.01)
- B23K 11/00 (2006.01)
- B23K 20/02 (2006.01)
- C21D 6/00 (2006.01)
- C22C 38/00 (2006.01)
- C22C 38/02 (2006.01)
- C22C 38/04 (2006.01)
- C22C 38/48 (2006.01)
- C22C 38/08 (2006.01)
- C22C 38/16 (2006.01)
- C22C 38/26 (2006.01)
- C22C 38/28 (2006.01)
- B01J 35/04 (2006.01)
- B01J 37/02 (2006.01)
- F01N 3/28 (2006.01)

(52) U.S. Cl.
CPC ............... *C22C 38/16* (2013.01); *C22C 38/26* (2013.01); *C22C 38/28* (2013.01); *C22C 38/44* (2013.01); *C22C 38/48* (2013.01); *C22C 38/50* (2013.01); *B01J 35/04* (2013.01); *B01J 37/0225* (2013.01); *B23K 2201/006* (2013.01); *B23K 2201/02* (2013.01); *F01N 3/281* (2013.01); *F01N 2330/02* (2013.01); *F01N 2530/04* (2013.01); *Y10T 428/12431* (2015.01)

(56) References Cited

U.S. PATENT DOCUMENTS

2007/0292300 A1* 12/2007 Rosberg et al. ............... 420/63
2008/0210348 A1* 9/2008 Goransson et al. ........... 148/537

FOREIGN PATENT DOCUMENTS

| JP | 6-116686 A | 4/1994 |
| JP | 6-212363 A | 8/1994 |
| JP | 6-104879 B | 12/1994 |
| JP | 2001-164341 | 6/2001 |
| JP | 3210535 B2 | 9/2001 |
| JP | 2005-504176 A | 2/2005 |
| JP | 2009-046718 A | 3/2009 |

OTHER PUBLICATIONS

Introduction to Steels and Cast Irons, Table 1.1 "Essential and incidental elements in steel and cast iron," ASM, 1992.*

Supplementary European Search Report dated Oct. 2, 2015 of corresponding European Application No. 11762734.9.

* cited by examiner

UNITS OF MEASURE FOR DIMENSIONS: mm

STAINLESS STEEL FOIL AND CATALYST CARRIER FOR EXHAUST GAS PURIFYING DEVICE USING THE FOIL

RELATED APPLICATIONS

This is a §371 of International Application No. PCT/JP2011/057489, with an international filing date of Mar. 18, 2011 (WO 2011/122503 A1, published Oct. 6, 2011), which is based on Japanese Patent Application No. 2010-076605, filed Mar. 30, 2010, the subject matter of which is incorporated by reference.

TECHNICAL FIELD

This disclosure relates to a stainless steel foil used in catalyst carriers for automotive exhaust gas purifying devices for automobiles, motorcycles, marine bikes, snowmobiles, and the like and which has high strength (in particular, in terms of Young's modulus, rupture stress, and distortion resistance) at high temperatures, excellent oxidation resistance at high temperatures, and excellent salt corrosion resistance, and also relates to a catalyst carrier for an exhaust gas purifying device using the foil.

BACKGROUND

Figure 1:
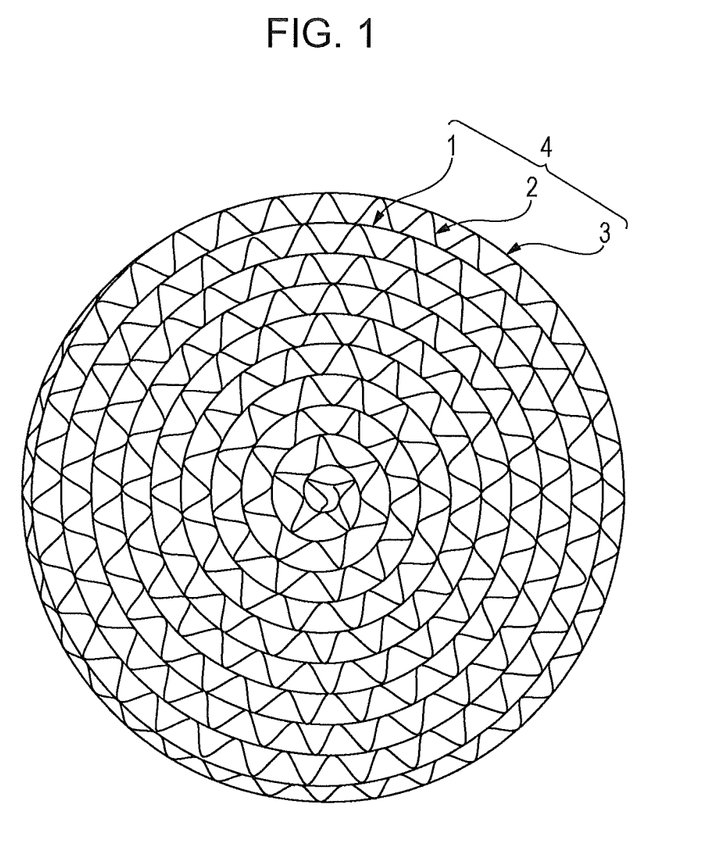
FIG. 1 is a view showing an example of a metal honeycomb.

Ferritic stainless steel composed of an Fe—Cr—Al-based alloy has excellent oxidation resistance at high temperatures and, therefore, is used in members (e.g., catalyst carriers, a variety of sensors, and the like) for automotive exhaust gas purifying devices for automobiles, motorcycles, marine bikes, motorboats, and the like. Furthermore, it is used in members of frames for stoves, gas burners, and heating furnaces, and also is used in electric heating elements of heaters by taking advantage of its property of high electric resistivity. For example, Japanese Unexamined Patent Application Publication No. 56-96726 discloses a metal honeycomb using, instead of a conventional ceramic catalyst carrier, an Fe—Cr—Al-based stainless steel foil with a foil thickness of 20 to 100 μm having excellent oxidation resistance at high temperatures for the purpose of downsizing of catalyst carriers for automotive exhaust gas purifying devices for automobiles and improvement in engine performance. Regarding this metal honeycomb, for example, flat stainless steel foils (flat sheets) and corrugated stainless steel foils (corrugated sheets) are alternately stacked to form a honeycomb structure, and a catalytic material is applied onto the surface of the stainless steel foils. The resulting metal honeycomb is used for an automotive exhaust gas purifying device. FIG. 1 shows an example of a metal honeycomb. A metal honeycomb 4 is produced by winding a stacked structure including a flat sheet 1 and a corrugated sheet 2 into a roll shape, and fastening the outer periphery thereof with an external cylinder 3.

When the wall thickness of a catalyst carrier is decreased by using such a stainless steel foil, its thermal capacity is decreased. Consequently, the catalyst can be activated in a short period of time from engine starting, and exhaust back pressure can be decreased, thus being effective in downsizing of the catalyst carrier and improvement in engine performance.

On the other hand, automobile exhaust gas regulations are expected to be further tightened from the standpoint of environmental protection. To reduce nitroxides, carbon monoxide, and carbon hydrides emitted from gasoline vehicles and the like, techniques such as one in which a catalyst carrier for an automotive exhaust gas purifying device is placed at a position immediately below the engine, close to the actual combustion environment, and a catalytic reaction is caused by high-temperature exhaust gas with the result that the amount of harmful substances in exhaust gas is reduced, have been developed. Furthermore, to improve fuel efficiency, engine combustion efficiency is enhanced, and the temperature of the exhaust gas itself is increased. Accordingly, catalyst carriers for automotive exhaust gas purifying devices are likely to be subjected to strong vibration in a harsher environment than before.

Stainless steel foils imparting various properties to catalyst carriers for automotive exhaust gas purifying devices have been proposed to cope with such a situation. For example, Japanese Unexamined Patent Application Publication (translation of PCT Application) No. 2005-504176 discloses a heat-resistant stainless steel foil in which Mo and W are incorporated into an Fe-20Cr-5Al alloy containing Zr, Hf, and a rare-earth element, and 1% to 15% of Ni is further incorporated thereinto to precipitate NiAl and, thereby, proof stress (strength) at high temperatures is increased, resulting in improvement in durability. Furthermore, Japanese Patent No. 3210535 (Japanese Unexamined Patent Application Publication No. 8-168680) discloses a stainless steel foil having excellent strength at high temperatures which is a material for low thermal capacity and low exhaust gas pressure use, in which the foil thickness is less than 40 μm, and the Al content and the Cr content are changed in response to the foil thickness, and into which Nb, Mo, Ta, W, and the like are incorporated. Japanese Unexamined Patent Application Publication No. 5-277380 discloses an alloy foil for a metal carrier in which proof stress at high temperatures and oxidation resistance are improved by incorporating Nb, Ta, Mo, and W into an Fe-20Cr-5Al alloy containing Y Mischmetal or mixed metals. Furthermore, Japanese Examined Patent Application Publication No. 6-104879 discloses a heat-resistant stainless steel foil in which proof stress at high temperatures are enhanced and durability is improved by incorporating a predetermined amount of Ta relative to C+N, Mo, W, and Nb into an Fe-20Cr-5Al alloy containing La, Ce, Pr, and Nd.

However, since a large amount of Ni, which is an austenite-stabilizing element, is contained in the stainless steel foil described in JP '176, the amount of solid solution Al, which is a ferrite-stabilizing element in steel, is decreased in the foil oxidation process, and part of the ferrite is austenitized. Therefore, the thermal expansion coefficient is largely changed, and strength at high temperatures, in particular, distortion resistance, of the catalyst carrier is decreased, which is a problem. As a result, in some cases, failures may occur such as falling off of the carried catalyst and collapse of the corrugated sheet.

Furthermore, in the stainless steel foils described in JP '535, JP '380 and JP '879, incorporation of Nb and Ta improves strength at high temperatures, but markedly decreases oxidation resistance at high temperatures, which is a problem. Moreover, Nb and Ta are likely to form oxides with Fe and Al, and such oxides cause distortion of the foil geometry in the heating process and the cooling process (a decrease in strength at high temperatures).

Furthermore, when the stainless steel foils described in JP '176, JP '680, JP '380 and JP '879 are applied to catalyst carriers for automotive exhaust gas purifying devices for marine bikes and motorboats, salt corrosion is likely to be caused by contact with seawater or the like, which is also a problem.

It could therefore be helpful to provide a stainless steel foil having high strength at high temperatures, excellent oxidation resistance at high temperatures, and excellent salt corrosion resistance, and a catalyst carrier for an exhaust gas purifying device using the foil.

SUMMARY

We discovered that, in an Fe—Cr—Al-based stainless steel foil, it is effective to decrease the contents of Nb and Ta, to set the Cr content at 25% by mass or more, and incorporate 0.5% to 6.0% by mass of at least one of Mo and W.

We thus provide a stainless steel foil characterized by containing, in percent by mass, 0.05% or less of C, 2.0% or less of Si, 1.0% or less of Mn, 0.003% or less of S, 0.05% or less of P, 25.0% to 35.0% of Cr, 0.05% to 0.30% of Ni, 3.0% to 10.0% of Al, 0.10% or less of N, 0.02% or less of Ti, 0.02% or less of Nb, 0.02% or less of Ta, 0.005% to 0.20% of Zr, 0.02% or less of Ce, 0.03% to 0.20% of REM excluding Ce, 0.5% to 6.0% in total of at least one of Mo and W, and the balance being Fe and incidental impurities.

Preferably, the stainless steel foil contains, in percent by mass, 2.5% to 5.0% in total of at least one of Mo and W. Furthermore, preferably, the stainless steel foil contains separately or together at least one of 0.01% to 0.20% (in percent by mass) of Hf, 10 to 300 ppm of Ca, and 15 to 300 ppm of Mg (in ppm by mass) or 0.03% to 1.0% of Cu. In other words, preferably, the stainless steel foil contains one or two or more of groups (A) to (C) below.

(A) In percent by mass, 2.5% to 5.0% in total of at least one of Mo and W.
(B) At least one of 0.01% to 0.20% (in percent by mass) of Hf, 10 to 300 ppm of Ca, and 15 to 300 ppm of Mg (in ppm by mass).
(C) In percent by mass, 0.03% to 1.0% of Cu.

In the stainless steel foil, preferably, the foil thickness is 40 μm or more.

We also provide a catalyst carrier for an exhaust gas purifying device characterized by using any of the stainless steel foils having the composition or foil thickness described above.

It is thus possible to obtain a stainless steel foil having high strength at high temperatures, excellent oxidation resistance at high temperatures, and excellent salt corrosion resistance. The stainless steel foil is suitable for use not only in catalyst carriers for automotive exhaust gas purifying devices for automobiles, motorcycles, marine bikes, snowmobiles, and the like, but also in members for other combustion gas exhaust system devices.

REFERENCE SIGNS LIST 1 flat sheet
2 corrugated sheet
3 external cylinder
4 metal honeycomb

DETAILED DESCRIPTION

First, reasons for limiting the composition of a stainless steel foil will be described in detail.

The units of measure "%" and "ppm" for the content of the compositional elements shown below mean "percent by mass" and "ppm by mass," respectively.

C: 0.05% or less

When the C content exceeds 0.05%, strength at high temperatures is decreased and oxidation resistance at high temperatures is also decreased. Furthermore, toughness is decreased. Therefore, the C content is set at 0.05% or less, and preferably 0.02% or less. More preferably, the C content is decreased as much as possible. However, in the case where the strength of steel is further improved, the C content is preferably set at 0.001% or more, and more preferably 0.003% or more.

Si: 2.0% or less

When the Si content exceeds 2.0%, toughness is decreased, and workability is degraded, resulting in difficulty in production of a foil. Therefore, the Si content is set at 2.0% or less, and preferably 1.0% or less. However, in the case where oxidation resistance is further improved, the Si content is preferably set at 0.05% or more, and more preferably 0.1% or more.

Mn: 1.0% or less

When the Mn content exceeds 1.0%, oxidation resistance at high temperatures is decreased, and salt corrosion resistance is also decreased. Therefore, the Mn content is set at 1.0% or less, and preferably 0.5% or less. However, in the case where it is necessary to further fix S in steel, the Mn content is preferably set at 0.05% or more, and more preferably 0.01% or more.

S: 0.003% or less

When the S content exceeds 0.003%, adhesion of an $Al_2O_3$ layer in a catalyst carrier and oxidation resistance at high temperatures are decreased. Therefore, the S content is set at 0.003% or less, and preferably 0.001% or less. More preferably, the S content is decreased as much as possible.

P: 0.05% or less

When the P content exceeds 0.05%, not only workability is degraded, resulting in difficulty in production of a foil, but also adhesion of an $Al_2O_3$ layer in a catalyst carrier and oxidation resistance at high temperatures are decreased. Therefore, the P content is set at 0.05% or less, and preferably 0.03% or less. More preferably, the P content is decreased as much as possible.

Cr: 25.0% to 35.0%

Cr is one of the most important elements and is an essential element in securing strength at high temperatures and salt corrosion resistance. We found that, to secure sufficient strength at high temperatures and salt corrosion resistance, desirably, the Young's modulus at 1,000° C. is 110 GPa or more and the pitting potential in a 3.5% NaCl solution at 30° C. is 300 mV vs SCE or more.

Figure 2:
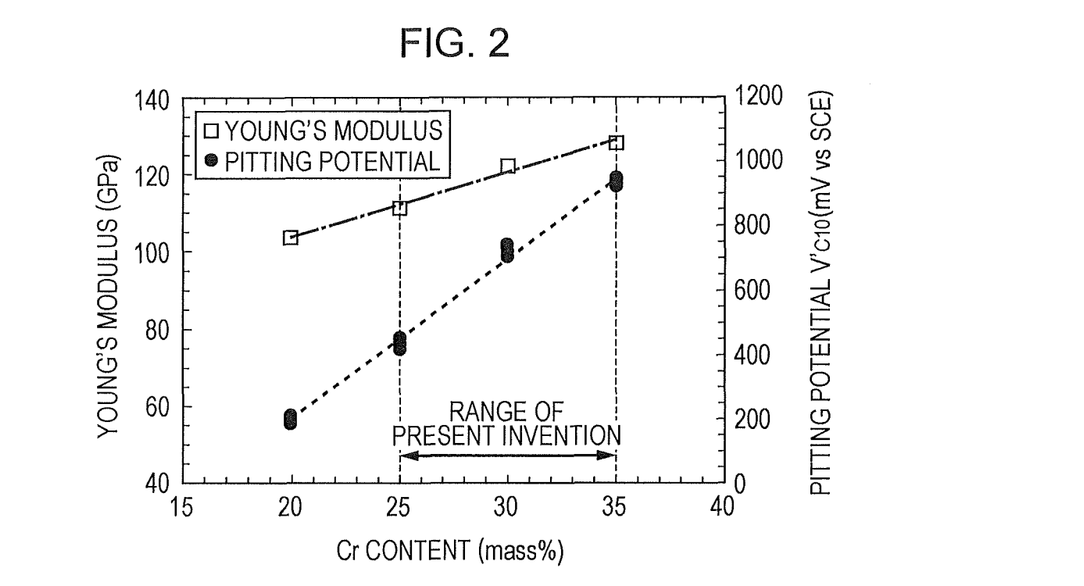
FIG. 2 is a graph showing the relationship between the Cr content and the Young's modulus and the relationship between the Cr content and the pitting potential.

Next, we will explain the Cr content within our range. FIG. 2 shows the results of the Young's modulus at 1,000° C. and the pitting potential in a 3.5% NaCl solution at 30° C., measured by the methods described later, when the Cr content in an alloy including 0.004% to 0.007% of C, 0.15% to 0.17% of Si, 0.13% to 0.16% of Mn, 0.0007% to 0.0008% of S, 0.023% to 0.025% of P, 0.10% to 0.16% of Ni, 5.2% to 5.8% of Al, 0.005% to 0.008% of N, 0.004% to 0.006% of Ti, 0.008% to 0.012% of Nb, 0.005% to 0.009% of Ta, 0.031% to 0.036% of Zr, 0.007% to 0.008% of Ce, 0.062% to 0.092% of La, 2.83% to 3.12% of Mo, 19 to 30 ppm of Ca, 13 to 30 ppm of Mg, and the balance being Fe and incidental impurities was changed in the range of 20.2% to 34.8%. As is clear from the results, by setting the Cr content at 25.0% or more, the Young's modulus is 110 GPa or more, which is 1.1 to 1.2 times, and the pitting potential is 300 mV vs SCE or more, which is 2 to 4 times, in comparison with the Fe-20Cr-5Al alloy having a Cr content of 20% described in each of JP '176, JP '535, JP '380 and JP '879. Furthermore, in the case of use in a harsher environment such as in a marine bike or a motorboat, the pitting potential is desirably 400 mV vs SCE or more, and in this case, the Cr content is preferably set at 26.0% or more. However, when the Cr content exceeds 35.0%, toughness is decreased and workability is degraded, resulting in difficulty in production of a foil. Therefore, the Cr content is set at 25.0% to 35.0%, preferably 26.0% to 32.0%, and more preferably 28.0% to 32.0%.

Ni: 0.05% to 0.30%

Ni has an effect of improving brazability when a catalyst carrier is formed and, thus, the content thereof is set at 0.05% or more. However, when the content of Ni, which is an austenite-stabilizing element, exceeds 0.30% and when, during the oxidation process at high temperatures, the amount of solid solution Al in the foil is decreased and Cr begins being oxidized, austenite is formed, which changes the thermal expansion coefficient of the foil, resulting in failures such as constriction and fracture of the foil. Therefore, the Ni content is set at 0.05% to 0.30%, and preferably 0.08% to 0.20%.

Al: 3.0% to 10.0%

Al is an element that forms a highly protective $Al_2O_3$ layer on the surface of a foil to improve oxidation resistance at high temperatures. However, when the Al content is less than 3.0%, sufficient oxidation resistance cannot be obtained. On the other hand, when the Al content exceeds 10.0%, workability is degraded, resulting in difficulty in production of a foil. Therefore, the Al content is set at 3.0% to 10.0%, and preferably 4.5% to 6.5%.

N: 0.10% or less

When the N content exceeds 0.10%, toughness is decreased, and workability is degraded, resulting in difficulty in production of a foil. Therefore, the N content is set at 0.10% or less, and preferably 0.05% or less.

Ti: 0.02% or less

Ti is an element that is likely to be oxidized. When the content thereof exceeds 0.02%, a large amount of Ti oxides is mixed into the $Al_2O_3$ layer, resulting in a marked decrease in brazability and a decrease in oxidation resistance at high temperatures. Therefore, the Ti content is set at 0.02% or less, and preferably 0.01% or less. More preferably, the Ti content is decreased as much as possible.

Nb: 0.02% or less

When the Nb content exceeds 0.02%, a non-protective oxide layer composed of $(Fe,Al)NbO_4$ is formed, resulting in a marked decrease in oxidation resistance at high temperatures. Furthermore, since $(Fe,Al)NbO_4$ has a high thermal expansion coefficient, it promotes distortion of the foil, which causes separation of the catalyst. Therefore, the Nb content is set at 0.02% or less, and preferably 0.01% or less. More preferably, the Nb content is decreased as much as possible.

Ta: 0.02% or less

As is the case with Nb, when the Ta content exceeds 0.02%, a non-protective oxide layer composed of $(Fe,Al)TaO_4$ having a high thermal expansion coefficient is formed, resulting in a marked decrease in oxidation resistance at high temperatures. The oxide layer promotes distortion of the foil, which causes separation of the catalyst. Therefore, the Ta content is set at 0.02% or less, and preferably 0.01% or less. More preferably, the Ta content is decreased as much as possible.

Furthermore, the total content of Nb and Ta is more preferably set at 0.03% or less, and still more preferably 0.02% or less.

Zr: 0.005% to 0.20%

Zr binds to C and N in steel to improve creep characteristics. At the same time, toughness is improved and workability is improved, facilitating production of a foil. Furthermore, Zr is concentrated in $Al_2O_3$ grain boundaries in the $Al_2O_3$ layer to improve oxidation resistance at high temperatures and strength at high temperatures, in particular, distortion resistance. It is necessary to set the Zr content at 0.005% or more to obtain such effects. On the other hand, when the Zr content exceeds 0.20%, Zr forms an intermetallic compound with Fe or the like, resulting in a decrease in toughness. Therefore, the Zr content is set at 0.005% to 0.20%, and preferably 0.01% to 0.05%.

Ce: 0.02% or less

When the Ce content exceeds 0.02%, CeO-type oxides are formed at the interface between the $Al_2O_3$ layer and the surface of base steel, which markedly decreases strength at high temperatures, in particular, distortion resistance, resulting in defects in geometry. Therefore, the Ce content is set at 0.02% or less. Preferably, the Ce content is decreased as much as possible.

REM (excluding Ce): 0.03% to 0.20%

The term "REM excluding Ce" refers to 14 elements with atomic numbers 57 to 71, such as La, Nd, and Sm, excluding Ce. In general, REM improves adhesion of an $Al_2O_3$ layer, and has a noticeable effect in improving peeling resistance of the $Al_2O_3$ layer in an environment repeatedly subjected to oxidation. Furthermore, since REM increases the size of resulting $Al_2O_3$ columnar crystals, the density of oxide grain boundaries serving as diffusion paths for oxygen is decreased, resulting in improvement in oxidation resistance at high temperatures and strength at high temperatures, in particular, distortion resistance. It is necessary to set the content of REM excluding Ce at 0.03% or more to obtain such effects. On the other hand, when the content of REM excluding Ce exceeds 0.20%, toughness is decreased, and workability is degraded, resulting in difficulty in production of a foil. Therefore, the content of REM excluding Ce is set at 0.03% to 0.20%, and preferably 0.05% to 0.10%.

At least one of Mo and W: 0.5% to 6.0% in total

Mo and W increase strength at high temperatures, in particular, the Young's modulus and rupture stress to prolong the life of catalyst carriers. Furthermore, these elements also stabilize an $Al_2O_3$ layer to improve salt corrosion resistance. It is necessary to set the content of at least one of Mo and W at 0.5% or more in total to obtain such effects. On the other hand, when the content of at least one of Mo and W exceeds 6.0% in total, workability is degraded, resulting in difficulty in production of a foil. Therefore, the content of at least one of Mo and W is set at 0.5% to 6.0% in total, and preferably 2.5% to 5.0% in total.

The balance other than the compositional elements described above is composed of Fe and incidental impurities. However, for the reasons described below, the steel foil may contain, separately or together, at least one of 0.01% to 0.20% of Hf, 10 to 300 ppm of Ca, and 15 to 300 ppm of Mg, or 0.03% to 1.0% of Cu.

At least one of Hf: 0.01% to 0.20%, Ca: 10 to 300 ppm, and Mg: 15 to 300 ppm

Since Hf improves adhesion between an $Al_2O_3$ layer and a substrate and suppresses a decrease in the amount of solid solution Al, an effect of improving oxidation resistance at high temperatures is exhibited. The Hf content is preferably set at 0.01% or more to obtain such an effect. On the other hand, when the Hf content exceeds 0.20%, Hf in the form of $HfO_2$ mixes into the $Al_2O_3$ layer and serves as a diffusion path for oxygen and oxidation rather hastens a decrease in the amount of solid solution Al. Furthermore, Hf forms an intermetallic compound with Fe, resulting in a decrease in toughness. Therefore, the Hf content is preferably set at 0.01% to 0.20%, and more preferably 0.02% to 0.10%.

Furthermore, as is the case with Hf, Ca and Mg have a function of improving adhesion of an $Al_2O_3$ layer. It is preferable to set the Ca content at 10 ppm or more and the Mg content at 15 ppm or more to obtain such an effect. On the other hand, when the Ca content or the Mg content exceeds 300 ppm, toughness is decreased, and oxidation resistance at high temperatures is also decreased. Therefore, preferably, the Ca content is set at 10 to 300 ppm, and the Mg content is set at 15 to 300 ppm. More preferably, each of the Ca content and the Mg content is set at 20 to 100 ppm.

Cu: 0.03% to 1.0%

Figure 3:
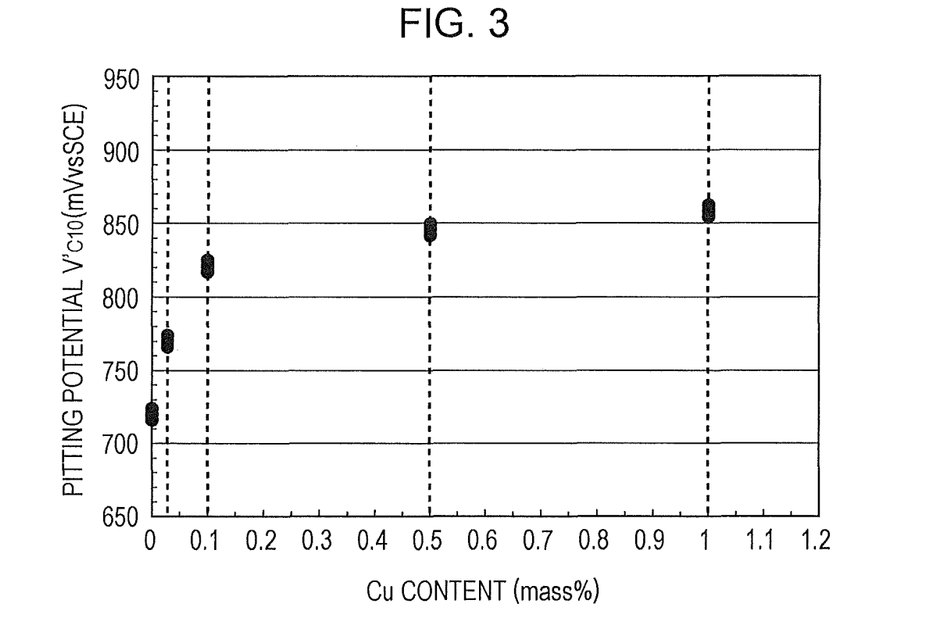
FIG. 3 is a graph showing the relationship between the Cu content and the pitting potential.

Cu is an element effective in improving oxidation resistance at high temperatures and improving salt corrosion resistance in an Fe—Cr—Al-based stainless steel foil with a Cr content of 25.0% or more and an Al content of 3.0% or more. FIG. 3 shows the results of the pitting potential in a 3.5% NaCl solution at 30° C., measured by the method described later, when the Cu content in an alloy containing 0.004% to 0.008% of C, 0.15% to 0.17% of Si, 0.12% to 0.15% of Mn, 0.0004% to 0.0009% of S, 0.023% to 0.025% of P, 30.2% to 30.7% of Cr, 0.11% to 0.15% of Ni, 5.1% to 5.8% of Al, 0.004% to 0.007% of N, 0.004% to 0.005% of Ti, 0.005% to 0.009% of Nb, 0.005% to 0.009% of Ta, 0.032% to 0.036% of Zr, 0.006% to 0.008% of Ce, 0.051% to 0.082% of La, 185% to 3.11% of Mo, 15 to 25 ppm of Ca, 15 to 31 ppm of Mg, and the balance being Fe and incidental impurities was changed in the range of 0% (note that 0% means equal to or less than the detection limit, and specifically, less than 0.01%) to 1.00%. As is clear from the results, by setting the Cu content at 0.03% or more, the pitting potential serving as an index of salt corrosion resistance is improved.

However, when the Cu content exceeds 1.0%, workability is degraded, resulting in difficulty in production of a foil. Therefore, the Cu content is set at 0.03% to 1.0%. The Cu content is preferably set at 0.1% to 0.5% in view of salt corrosion resistance and low cost.

When a stainless steel foil having the composition described above is used in a catalyst carrier for an automotive exhaust gas purifying device, a smaller foil thickness is more advantageous to decrease the exhaust back pressure. However, as described in the beginning, catalyst carriers for automotive exhaust gas purifying devices have become to be used in a harsher environment than before and there is a possibility of occurrence of fractures and the like. Therefore, preferably, the foil thickness is set at 40 μm or more. From the standpoint of the exhaust back pressure, more preferably, the foil thickness is set at 110 μm or less.

Our stainless steel foil can be produced, for example, by the production method described below.

First, steel having the composition described above is refined with a steel converter, an electric furnace, or the like and subjected to secondary refining by VOD (vacuum oxygen decarburization) or AOD (argon oxygen decarburization). Then, the refined steel is formed into a steel slab by ingot making-blooming or continuous casting, and the steel slab is heated to 1,050° C. to 1,250° C. and then subjected to hot rolling to produce a hot-rolled steel sheet. Next, scales on the surface of the hot-rolled steel sheet are removed by pickling, shotblasting, grinding, or the like, and annealing and cold rolling are repeated several times. Thereby, a stainless steel foil with a predetermined thickness, for example, 40 to 110 μm, is produced.

EXAMPLES

Steels having the compositions shown in Table 1-1 and Table 1-2 which had been refined by vacuum melting were heated to 1,200° C. and then subjected to hot rolling in the temperature range of 900° C. to 1,200° C. to obtain hot-rolled steel sheets having a thickness of 4 mm. Next, the resulting hot-rolled steel sheet were annealed in air at 1,000° C. and subjected to pickling, followed by cold rolling to obtain cold-rolled steel sheets with a thickness of 1.0 mm. In this stage, in the steel No. 21 of Table 1 having a Cr content of 40.0%, which exceeded our range, fractures occurred during hot rolling, and it was not possible to form a hot-rolled steel sheet. The cold-rolled steel sheets excluding the steel No. 21 were annealed in air at 950° C. to 1,050° C.×1 minute and then subjected to pickling. Cold rolling with a cluster mill and annealing were repeated several times to obtain foils with a width of 100 mm and a foil thickness of 40 μm.

Regarding the hot-rolled steel sheets, the cold-rolled steel sheets, and the foils thus obtained, strength at high temperatures (Young's modulus, rupture stress, distortion resistance), oxidation resistance at high temperatures, and salt corrosion resistance were evaluated by the methods described below.

Young's modulus: First, the hot-rolled steel sheet with a thickness of 4 mm was subjected to a heat treatment at 1,200° C.×30 minutes, as a pretreatment. The reason for this is that, in a honeycomb carrier, usually, after the honeycomb is assembled, a heat treatment at 1,150° C. to 1,250° C.×about 30 minutes is performed when contact points between a corrugated sheet (sheet which has been subjected to corrugation) and a flat sheet are subjected to diffusion bonding or bonding by brazing. Next, in accordance with JIS Z 2280 "Test method for Young's modulus of metallic materials at elevated temperature," a specimen of 2 mm in thickness×10 mm in width× 60 mm in length was cut out from the heat-treated, hot-rolled steel sheet, and the end faces thereof were smoothed. Then, the Young's modulus at 1,000° C. was measured using a resonance method. The measurement results of the Young's modulus were evaluated by the following criteria: ×C: less than 110 GPa, ⊙B: 110 GPa or more and less than 120 GPa, and ⊙: 120 GPa or more. When evaluated to be ⊙B or ⊙A, the specimen was considered to be satisfactory.

Figure 4:
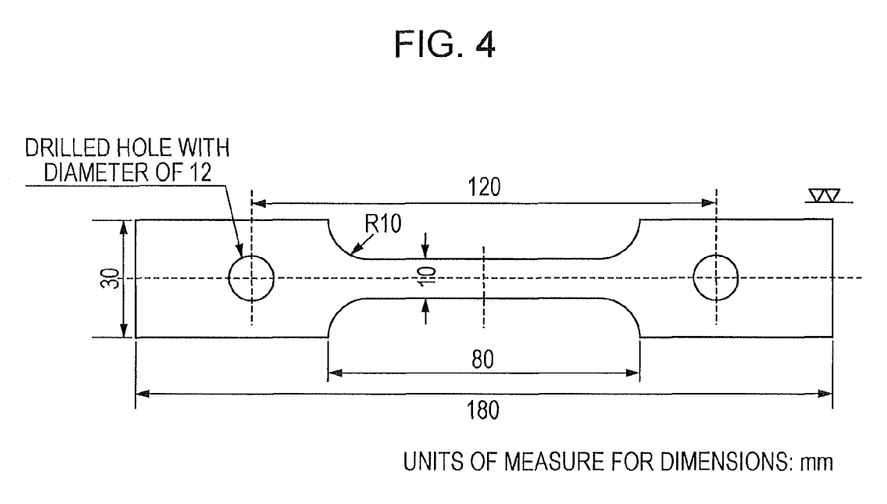
FIG. 4 is a view showing the shape of a specimen used in the high-temperature tensile test in Examples.

Rupture stress: First, the cold-rolled steel sheet with a thickness of 1 mm was subjected to a heat treatment at 1,200° C.×30 minutes corresponding to a heat treatment during diffusion bonding or bonding by brazing. Next, a specimen shown in FIG. 4 was cut out from the heat-treated, cold-rolled steel sheet, and by carrying out a high-temperature tensile test at 900° C., the rupture stress was measured. In this case, the cross head speed was set at 0.2 mm/min initially and at 5 mm/min after the proof stress was exceeded. The measurement results of the rupture stress were evaluated by the following criteria: ×C: less than 40 MPa, ⊙B: 40 MPa or more and less than 60 MPa, and ⊙A: 60 MPa or more. When evaluated to be ⊙B or ⊙A, the specimen was considered to be satisfactory.

Distortion resistance: First, the foil with a foil thickness of 40 μm was subjected to a heat treatment at 1,200° C.×30 minutes, corresponding to a heat treatment during diffusion bonding or bonding by brazing, in a vacuum of $4\times10^{-5}$ Torr ($5.3\times10^{-3}$ Pa) or less. Next, a specimen of 100 mm in width× 50 mm in length was cut out from the heat-treated foil, and rolled, in the length direction, into a cylinder with a diameter of 5 mm, and the edges thereof were fastened by spot welding. Three such specimens were prepared for each foil. The specimens were heated at 1,150° C.×400 hours in an air atmosphere furnace, and an average dimensional distortion (the ratio of the increased length of the cylinder after heating to the length of the cylinder before heating) of the three specimens was measured. The measurement results of the average dimensional distortion were evaluated by the following criteria: ×C: more than 5%, ○B: more than 3% and 5% or less, and ⊙A: 3% or less. When evaluated to be ○B or ⊙A, the foil was considered to be satisfactory.

Oxidation resistance at high temperatures: First, the foil with a foil thickness of 40 μm was subjected to a heat treatment at 1,200° C.×30 minutes, corresponding to a heat treatment during diffusion bonding or bonding by brazing, in a vacuum of $4 \times 10^{-5}$ Torr ($5.3 \times 10^{-3}$ Pa) or less. Next, three specimens of 20 mm in width×30 mm in length were cut out from the heat-treated foil, and heated at 1,150° C.×400 hours in an air atmosphere furnace. An average amount of increase due to oxidation (the amount obtained by dividing the change in weight before and after heating with the initial surface area) of the three specimens was measured. In this case, scales separated from the specimen after heating were collected and added to the amount of increase due to oxidation. The measurement results of the average amount of increase due to oxidation were evaluated by the following criteria: ×C: more than 15 g/m², ○B: more than 10 g/m² and 15 g/m² or less, and ⊙A: 10 g/m² or less. When evaluated to be ○B or ⊙A, the foil was considered to be satisfactory.

Salt corrosion resistance: First, a 20 mm square specimen was cut out from the cold-rolled steel sheet with a thickness of 1 mm, and the specimen was sealed with a resin excluding an area of 11×11 mm on the surface. Then, a passivation treatment was performed by immersing the specimen in nitric acid with a concentration of 10%. Furthermore, an area of 10×10 mm on the surface was polished. Next, on the basis of JIS G0577 "Method of pitting potential measurement for stainless steels," the specimen was immersed in a 3.5% NaCl solution at 30° C. and left to stand for 10 minutes. Then, potential scanning was started, and the pitting potential was measured. The measurement results of the pitting potential were evaluated by the following criteria: ×C: less than 300 (mV vs SCE), ○B: 300 (mV vs SCE) or more and less than 700 (mV vs SCE), and ⊙A: 700 (mV vs SCE) or more. When evaluated to be ○B or ⊙A, the specimen was considered to be satisfactory.

The results are shown in Table 2-1 and Table 2-2. As is obvious from the tables, the steel Nos. 1 to 16 and 23 to 28, which are our Examples, have high strength at high temperatures (Young's modulus, rupture stress, distortion resistance), excellent oxidation resistance at high temperatures, and excellent salt corrosion resistance. In contrast, the steel Nos. 17 to 22 and 29, which are Comparative Examples, are poor in terms of at least one property of strength at high temperatures, oxidation resistance at high temperatures, and salt corrosion resistance.

INDUSTRIAL APPLICABILITY

It is possible to obtain a stainless steel foil having high strength at high temperatures, excellent oxidation resistance at high temperatures, and excellent salt corrosion resistance. Our stainless steel foils are suitable for use not only in catalyst carriers for automotive exhaust gas purifying devices for automobiles, motorcycles, marine bikes, snowmobiles, and the like, but also in members for other combustion gas exhaust system devices

TABLE 1-1

| Steel No. | C | Si | Mn | P | S | Cr | Ni | Al | N | Ti | Nb | Ta | Zr | Ce | La | REM excluding Ce Nb | Sm |
|---|---|---|---|---|---|---|---|---|---|---|---|---|---|---|---|---|---|
| 1 | 0.005 | 0.16 | 0.13 | 0.025 | 0.0008 | 30.2 | 0.11 | 5.8 | 0.007 | 0.004 | 0.005 | 0.005 | 0.033 | 0.008 | 0.082 | — | — |
| 2 | 0.005 | 0.17 | 0.12 | 0.025 | 0.0005 | 25.7 | 0.12 | 5.8 | 0.006 | 0.005 | 0.006 | 0.005 | 0.035 | 0.005 | 0.075 | — | — |
| 3 | 0.006 | 0.15 | 0.16 | 0.028 | 0.0006 | 27.8 | 0.10 | 5.0 | 0.005 | 0.011 | 0.008 | 0.006 | 0.034 | 0.006 | 0.076 | — | — |
| 4 | 0.006 | 0.16 | 0.20 | 0.025 | 0.0007 | 30.1 | 0.08 | 5.8 | 0.005 | 0.006 | 0.005 | 0.005 | 0.036 | 0.006 | 0.080 | — | — |
| 5 | 0.006 | 0.15 | 0.15 | 0.025 | 0.0006 | 25.8 | 0.11 | 5.6 | 0.014 | 0.006 | 0.009 | 0.005 | 0.033 | 0.007 | 0.100 | — | — |
| 6 | 0.007 | 0.17 | 0.13 | 0.025 | 0.0008 | 30.2 | 0.10 | 5.8 | 0.005 | 0.005 | 0.012 | 0.006 | 0.031 | 0.008 | 0.092 | — | — |
| 7 | 0.006 | 0.16 | 0.14 | 0.023 | 0.0008 | 32.2 | 0.08 | 5.3 | 0.005 | 0.005 | 0.008 | 0.008 | 0.039 | 0.010 | 0.062 | 0.032 | — |
| 8 | 0.008 | 0.14 | 0.16 | 0.021 | 0.0006 | 30.1 | 0.09 | 5.7 | 0.006 | 0.006 | 0.005 | 0.009 | 0.032 | 0.008 | — | — | 0.064 |
| 9 | 0.011 | 0.17 | 0.18 | 0.020 | 0.0007 | 28.5 | 0.11 | 3.9 | 0.008 | 0.006 | 0.011 | 0.008 | 0.032 | 0.003 | 0.072 | — | — |
| 10 | 0.008 | 0.11 | 0.13 | 0.020 | 0.0005 | 25.5 | 0.15 | 5.3 | 0.006 | 0.006 | 0.005 | 0.004 | 0.029 | 0.008 | 0.093 | — | — |
| 11 | 0.006 | 0.15 | 0.12 | 0.028 | 0.0007 | 25.5 | 0.12 | 5.6 | 0.008 | 0.005 | 0.005 | 0.005 | 0.035 | 0.006 | 0.085 | — | — |
| 12 | 0.007 | 0.16 | 0.15 | 0.023 | 0.0006 | 30.3 | 0.11 | 5.7 | 0.004 | 0.004 | 0.006 | 0.003 | 0.041 | 0.007 | 0.076 | — | — |
| 13 | 0.005 | 0.17 | 0.16 | 0.024 | 0.0007 | 30.9 | 0.15 | 5.5 | 0.007 | 0.005 | 0.005 | 0.005 | 0.039 | 0.008 | 0.088 | — | — |
| 14 | 0.006 | 0.15 | 0.19 | 0.022 | 0.0006 | 29.8 | 0.11 | 5.0 | 0.011 | 0.011 | 0.007 | 0.006 | 0.035 | 0.007 | 0.046 | — | — |
| 15 | 0.007 | 0.15 | 0.15 | 0.023 | 0.0007 | 25.8 | 0.10 | 5.8 | 0.008 | 0.006 | 0.008 | 0.005 | 0.036 | 0.008 | 0.085 | — | — |

| Steel No. | W | Mo | Hf | Ca (ppm) | Mg (ppm) | Cu | Remarks |
|---|---|---|---|---|---|---|---|
| 1 | — | 3.10 | — | 15 | 25 | — | Invention example |
| 2 | — | 2.00 | — | 16 | 30 | — | Invention example |
| 3 | — | 1.98 | — | 18 | 23 | — | Invention example |
| 4 | — | 4.98 | 0.015 | 22 | 32 | — | Invention example |
| 5 | 2.15 | — | — | 23 | 22 | — | Invention example |

TABLE 1-1-continued

| | | | | | | |
|---|---|---|---|---|---|---|
| 6 | — | 3.05 | — | 30 | 30 | — | Invention example |
| 7 | — | 4.50 | — | 25 | 15 | — | Invention example |
| 8 | 1.56 | 3.25 | — | 13 | 15 | — | Invention example |
| 9 | — | 3.52 | 0.042 | 19 | 20 | — | Invention example |
| 10 | — | 2.10 | — | 23 | 30 | — | Invention example |
| 11 | 4.85 | — | — | 25 | 22 | — | Invention example |
| 12 | — | 1.58 | — | 25 | 21 | — | Invention example |
| 13 | — | 3.56 | 0.036 | 26 | 30 | — | Invention example |
| 14 | — | 4.56 | — | 23 | 20 | — | Invention example |
| 15 | — | 2.83 | — | 22 | 13 | — | Invention example |

TABLE 1-2

| Steel No. | Composition (mass %) | | | | | | | | | | | | | | REM excluding Ce | | |
|---|---|---|---|---|---|---|---|---|---|---|---|---|---|---|---|---|---|
| | C | Si | Mn | P | S | Cr | Ni | Al | N | Ti | Nb | Ta | Zr | Ce | La | Nb | Sm |
| 16 | 0.006 | 0.15 | 0.16 | 0.025 | 0.0008 | 26.5 | 0.12 | 5.6 | 0.015 | 0.006 | 0.006 | 0.003 | 0.032 | 0.009 | 0.095 | — | — |
| 17 | 0.008 | 0.15 | 0.16 | 0.025 | 0.0006 | 20.2 | 0.11 | 5.8 | 0.008 | 0.004 | 0.005 | 0.003 | 0.036 | 0.008 | 0.075 | — | — |
| 18 | 0.006 | 0.16 | 0.13 | 0.023 | 0.0007 | 29.8 | 0.13 | 5.6 | 0.007 | 0.004 | 0.720 | 0.002 | 0.035 | 0.005 | — | — | — |
| 19 | 0.008 | 0.15 | 0.12 | 0.025 | 0.0005 | 30.6 | 0.15 | 5.8 | 0.008 | 0.005 | 0.006 | 1.020 | 0.004 | 0.003 | 0.095 | — | — |
| 20 | 0.008 | 0.17 | 0.13 | 0.026 | 0.0008 | 30.0 | 0.16 | 5.3 | 0.006 | 0.015 | 0.007 | 0.002 | 0.050 | 0.042 | 0.075 | — | — |
| 21 | 0.007 | 0.16 | 0.18 | 0.027 | 0.0005 | 40.0 | 0.11 | 5.4 | 0.007 | 0.006 | 0.005 | 0.005 | 0.036 | 0.005 | 0.085 | — | — |
| 22 | 0.008 | 0.18 | 0.15 | 0.026 | 0.0006 | 25.6 | 1.50 | 5.8 | 0.005 | 0.004 | 0.006 | 0.003 | 0.032 | 0.007 | 0.075 | — | — |
| 23 | 0.005 | 0.15 | 0.12 | 0.024 | 0.0007 | 25.0 | 0.12 | 5.8 | 0.004 | 0.004 | 0.008 | 0.006 | 0.035 | 0.008 | 0.076 | — | — |
| 24 | 0.005 | 0.15 | 0.12 | 0.025 | 0.0007 | 30.2 | 0.11 | 5.1 | 0.004 | 0.005 | 0.008 | 0.005 | 0.033 | 0.008 | 0.051 | — | — |
| 25 | 0.006 | 0.16 | 0.12 | 0.023 | 0.0009 | 30.4 | 0.15 | 5.3 | 0.006 | 0.004 | 0.007 | 0.006 | 0.034 | 0.006 | 0.069 | — | — |
| 26 | 0.004 | 0.17 | 0.15 | 0.023 | 0.0004 | 30.3 | 0.12 | 5.4 | 0.004 | 0.005 | 0.005 | 0.008 | 0.036 | 0.008 | 0.072 | — | — |
| 27 | 0.008 | 0.15 | 0.14 | 0.023 | 0.0009 | 30.7 | 0.11 | 5.2 | 0.005 | 0.004 | 0.009 | 0.009 | 0.032 | 0.007 | 0.074 | — | — |
| 28 | 0.004 | 0.16 | 0.16 | 0.025 | 0.0008 | 34.8 | 0.13 | 5.7 | 0.005 | 0.004 | 0.009 | 0.009 | 0.032 | 0.008 | 0.062 | — | — |
| 29 | 0.007 | 0.15 | 0.13 | 0.023 | 0.0007 | 20.2 | 0.16 | 5.2 | 0.005 | 0.004 | 0.009 | 0.009 | 0.032 | 0.007 | 0.068 | — | — |

| Steel No. | Composition (mass %) | | | | | | |
|---|---|---|---|---|---|---|---|
| | W | Mo | Hf | Ca (ppm) | Mg (ppm) | Cu | Remarks |
| 16 | 2.06 | 1.06 | — | 21 | 33 | — | " |
| 17 | — | — | — | 19 | 18 | — | Comparative example |
| 18 | 1.51 | — | — | 23 | 25 | — | Comparative example |
| 19 | — | — | — | 23 | 23 | — | Comparative example |
| 20 | — | 3.25 | — | 19 | 23 | — | Comparative example |
| 21 | 2.50 | — | — | 22 | 23 | — | Comparative example |
| 22 | — | 2.98 | — | 19 | 22 | — | Comparative example |
| 23 | — | 3.00 | — | 24 | 22 | — | Invention example |
| 24 | — | 3.11 | — | 16 | 25 | 0.03 | Invention example |
| 25 | — | 2.85 | — | 25 | 15 | 0.12 | Invention example |
| 26 | — | 3.02 | — | 23 | 31 | 0.51 | Invention example |
| 27 | — | 2.95 | — | 24 | 20 | 1.00 | Invention example |

TABLE 1-2-continued

| | | | | | | | |
|---|---|---|---|---|---|---|---|
| 28 | — | 3.12 | — | 19 | 25 | — | Invention example |
| 29 | — | 2.91 | — | 24 | 29 | — | Comparative example |

TABLE 2-1

| Steel No. | Strength at high temperatures | | | | | | Oxidation resistance at high temperatures | | Salt corrosion resistance | | | |
|---|---|---|---|---|---|---|---|---|---|---|---|---|
| | Young's modulus | | Rupture stress | | Distortion resistance | | Amount of | | Pitting | | | |
| | GPa | Evaluation | MPa | Evaluation | Distortion (%) | Evaluation | increase due to oxidation (g/m²) | Evaluation | potential (mV vs SCE) | Evaluation | Others | Remarks |
| 1 | 122 | ⊙ | 88 | ⊙ | 0.5 | ⊙ | 5.4 | ⊙ | 721 | ⊙ | — | Invention example |
| 2 | 111 | ○ | 57 | ○ | 1.0 | ⊙ | 7.1 | ⊙ | 421 | ○ | — | " |
| 3 | 121 | ⊙ | 62 | ⊙ | 1.1 | ⊙ | 6.8 | ⊙ | 710 | ⊙ | — | " |
| 4 | 128 | ⊙ | 100 | ⊙ | 0.6 | ⊙ | 5.9 | ⊙ | 768 | ⊙ | — | " |
| 5 | 112 | ○ | 54 | ○ | 0.9 | ⊙ | 6.8 | ⊙ | 435 | ○ | — | " |
| 6 | 122 | ⊙ | 85 | ⊙ | 0.4 | ⊙ | 6.1 | ⊙ | 754 | ⊙ | — | " |
| 7 | 131 | ⊙ | 104 | ⊙ | 0.6 | ⊙ | 5.5 | ⊙ | 802 | ⊙ | — | " |
| 8 | 130 | ⊙ | 98 | ⊙ | 1.2 | ⊙ | 6.1 | ⊙ | 785 | ⊙ | — | " |
| 9 | 124 | ⊙ | 82 | ⊙ | 3.2 | ○ | 13 | ○ | 715 | ⊙ | — | " |
| 10 | 121 | ⊙ | 71 | ⊙ | 2.1 | ⊙ | 7.4 | ⊙ | 390 | ○ | — | " |
| 11 | 126 | ⊙ | 81 | ⊙ | 1.9 | ⊙ | 7.1 | ⊙ | 705 | ⊙ | — | " |
| 12 | 118 | ○ | 58 | ○ | 0.6 | ⊙ | 5.9 | ⊙ | 815 | ⊙ | — | " |
| 13 | 127 | ⊙ | 91 | ⊙ | 1.2 | ⊙ | 5.4 | ⊙ | 834 | ⊙ | — | " |
| 14 | 130 | ⊙ | 98 | ⊙ | 0.6 | ⊙ | 7.9 | ⊙ | 726 | ⊙ | — | " |
| 15 | 111 | ○ | 65 | ⊙ | 1.6 | ⊙ | 6.9 | ⊙ | 714 | ⊙ | — | " |
| 16 | 120 | ⊙ | 72 | ⊙ | 0.9 | ⊙ | 7.4 | ⊙ | 731 | ⊙ | — | " |

TABLE 2-2

| Steel No. | Strength at high temperatures | | | | | | Oxidation resistance at high temperatures | | Salt corrosion resistance | | | |
|---|---|---|---|---|---|---|---|---|---|---|---|---|
| | Young's modulus | | Rupture stress | | Distortion resistance | | Amount of | | Pitting | | | |
| | GPa | Evaluation | MPa | Evaluation | Distortion (%) | Evaluation | increase due to oxidation (g/m²) | Evaluation | potential (mV vs SCE) | Evaluation | Others | Remarks |
| 17 | 98 | X | 34 | X | 3.4 | ○ | 11 | ○ | 151 | X | — | Comparative example |
| 18 | 121 | ⊙ | 52 | ○ | 6.4 | X | 57 | X | 310 | ○ | — | Comparative example |
| 19 | 120 | ⊙ | 54 | ○ | 7.2 | X | 48 | X | 282 | X | — | Comparative example |
| 20 | 122 | ⊙ | 57 | ○ | 6.1 | X | 64 | X | 769 | ⊙ | — | Comparative example |
| 21 | — | — | — | — | — | — | — | — | — | — | Unable to be rolled | Comparative example |
| 22 | 113 | ○ | 50 | ○ | 9.1 | X | 12 | ○ | 432 | ○ | — | Comparative example |
| 23 | 113 | ○ | 71 | ⊙ | 0.5 | ⊙ | 7.2 | ⊙ | 452 | ○ | — | Invention example |
| 24 | 121 | ⊙ | 75 | ⊙ | 0.7 | ⊙ | 6.5 | ⊙ | 773 | ⊙ | — | " |
| 25 | 125 | ⊙ | 74 | ⊙ | 0.5 | ⊙ | 6.8 | ⊙ | 820 | ⊙ | — | " |
| 26 | 124 | ⊙ | 76 | ⊙ | 1.2 | ⊙ | 7.1 | ⊙ | 845 | ⊙ | — | " |
| 27 | 128 | ⊙ | 71 | ⊙ | 1.4 | ⊙ | 5.9 | ⊙ | 858 | ⊙ | — | " |
| 28 | 128 | ⊙ | 108 | ⊙ | 0.6 | ⊙ | 6.4 | ⊙ | 948 | ⊙ | — | " |
| 29 | 103 | X | 38 | X | 3.5 | ○ | 14 | ○ | 210 | X | — | Comparative example |

The invention claimed is:

1. A stainless steel foil comprising: in percent by mass, 0.05% or less of C, 0.05 to 2.0% of Si, 1.0% or less of Mn, 0.003% or less of S, 0.05% or less of P, more than 28% to 35.0% of Cr, 0.05% to 0.30% of Ni, 4.5% to 10.0% of Al, 0.10% or less of N, 0.02% or less of Ti, 0.02% or less of Nb, 0.02% or less of Ta, 0.005% to 0.05% of Zr, 0.02% or less of Ce, 0.03% to 0.20% of REM excluding Ce, 0.5% to 6.0% in total of at least one of Mo and W, and the balance being Fe and incidental impurities.

2. The stainless steel foil according to claim 1, wherein, in percent by mass, the steel foil comprises 2.5% to 5.0% in total of at least one of Mo and W.

3. The stainless steel foil according to claim 1, further comprising at least one of 0.01% to 0.20% (in percent by mass) of Hf, 10 to 300 ppm of Ca, and 15 to 300 ppm of Mg (in ppm by mass).

4. The stainless steel foil according to claim 1, further comprising, in percent by mass, 0.03% to 1.0% of Cu.

5. The stainless steel foil according to claim 1, wherein the foil thickness is 40 µm or more.

6. A catalyst carrier for an exhaust gas purifying device comprising the stainless steel foil according to claim 1.

7. The stainless steel foil according to claim 2, further comprising at least one of 0.01% to 0.20% (in percent by mass) of Hf, 10 to 300 ppm of Ca, and 15 to 300 ppm of Mg (in ppm by mass).

8. The stainless steel foil according to claim 2, further comprising, in percent by mass, 0.03% to 1.0% of Cu.

9. The stainless steel foil according to claim 3, further comprising, in percent by mass, 0.03% to 1.0% of Cu.

10. The stainless steel foil according to claim 2, wherein the foil thickness is 40 µm or more.

11. The stainless steel foil according to claim 3, wherein the foil thickness is 40 µm or more.

12. The stainless steel foil according to claim 4, wherein the foil thickness is 40 µm or more.

13. A catalyst carrier for an exhaust gas purifying device comprising the stainless steel foil according to claim 2.

14. A catalyst carrier for an exhaust gas purifying device comprising the stainless steel foil according to claim 3.

15. A catalyst carrier for an exhaust gas purifying device comprising the stainless steel foil according to claim 4.

16. A catalyst carrier for an exhaust gas purifying device comprising the stainless steel foil according to claim 5.

* * * * *